United States Patent [19]

Manwiller

[11] Patent Number: 4,622,384

[45] Date of Patent: Nov. 11, 1986

[54] POLYIMIDE MOLDING RESINS AND MOLDED ARTICLES

[75] Inventor: Carl H. Manwiller, Christiana, Del.

[73] Assignee: E. I. Du Pont de Nemours and Company, Wilmington, Del.

[21] Appl. No.: 727,811

[22] Filed: Apr. 26, 1985

[51] Int. Cl.$^4$ .............................................. C08G 69/26
[52] U.S. Cl. .................................... 528/353; 528/491; 528/492
[58] Field of Search ....................... 528/353, 491, 492

[56] References Cited

U.S. PATENT DOCUMENTS 3,179,631  4/1965  Endrey .................................. 260/78
3,249,588  5/1966  Gall ...................................... 269/47
4,225,702  9/1980  Makino et al. ....................... 528/353
4,413,117  11/1983  Reiter et al. ..................... 528/353 X
4,489,185  12/1984  Schoenburg .................... 528/353 X
4,535,115  8/1985  Bakshi et al. ................... 528/353 X

FOREIGN PATENT DOCUMENTS 981543  1/1962  United Kingdom .
980855  1/1963  United Kingdom .

Primary Examiner—Lucille M. Phynes
Attorney, Agent, or Firm—Donald W. Huntley

[57] ABSTRACT

Particulate polyimide molding resin characterized by high surface area and low crystallinity and molded articles prepared therefrom having unusually high toughness.

11 Claims, 6 Drawing Figures

EFFECTS OF 1% HYDROXIDE SOLUTION

△ EXAMPLE 17
X EXAMPLE 16
○ CONTROL EXAMPLE M

EFFECT OF WARM ACETIC ACID ON TENSILE STRENGTH OF POLYIMIDE RESINS

● COMPARATIVE EXAMPLE N SINTERED AT 405°C
X EXAMPLE 18 SINTERED AT 380°C
○ EXAMPLE 18 SINTERED AT 405°C

COMPARATIVE TENSILE PROPERTIES
-GRAPHITE FILLED RESINS

X = EXAMPLES 19-23
o = COMPARATIVE EXAMPLES O&P

WT% GRAPHITE

POLYIMIDE MOLDING RESINS AND MOLDED ARTICLES

BACKGROUND OF THE INVENTION

Aromatic polyimide materials are generally prepared by the reaction of an organic diamine with a tetracarboxylic acid dianhydride to form a polyamide acid, with subsequent conversion of the polyamide acid to a polyimide. Techniques for the preparation of such are found, for example, in Endrey, U.S. Pat. No. 3,179,631, British Pat. No. 981,543, and Gall, U.S. Pat. No. 3,249,588. The Endrey patent involves simultaneously converting the polyamide acid to the polyimide and precipitating the polymer from solution. An alternative technique previously suggested and illustrated in example 7 of the Endrey patent involves first precipitating the polyamide acid and subsequently converting the polyamide acid to polyimide by thermal or chemical means. This results in resins having low crystallinity and low surface area. The processes shown in the Gall patent result in polyimides having high surface area and high crystallinity.

Polyimides are used industrially in a wide variety of applications. For example, polyimides can be formed into a shaped article such as a film, or can be compounded into a coating enamel. Still other uses for such resins are in molding applications, in which polyimide in particulate form is fabricated into various configurations that can be used in a variety of technically demanding environments such as jet engines, business machines, automotive components and diverse industrial equipment. Such molded polyimide parts are capable of withstanding high temperatures and exhibit excellent bearing properties, good electrical properties and excellent creep resistance. However, continuing effort has been directed to the improvement of the mechanical properties of these resins, such as toughness, which would permit their use in a still broader range of high temperature environments.

SUMMARY OF THE INVENTION

The present invention provides an improved polyimide molding resin which is characterized by excellent toughness in a molded configuration.

Specifically, the instant invention provides, in solid particulate polyimide, the polyimide having the recurring unit

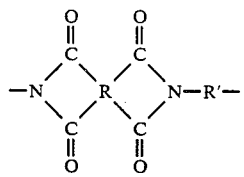

wherein R is a tetravalent radical containing at least one 6-carbon atom ring characterized by benzenoid unsaturation and wherein the four carbonyl groups are attached directly to different carbon atoms in the radical and wherein each pair of carbonyl groups is attached to adjacent carbon atoms in a 6-membered benzenoid ring of the radical, and wherein R' is a divalent radical containing at least one six-carbon atom ring, each ring characterized by benzenoid unsaturation and, when at least two rings are present in R', no more than one of the valence bonds is located on any one of the rings, said particles having surface area of greater than 20 square meters per gram, the improvement wherein the polyimide exhibits a Crystallinity Index of less than about 15, as measured by X-ray diffraction.

The invention also provides molded articles of this polyimide, which, when molded to a density of at least about 1.30 g/cc and without filler, exhibit a tensile elongation of greater than about 20% and a tensile strength of greater than about 12.0 kpsi.

The invention further provides, in a process for the preparation of a solid particulate polyimide by the reaction of (1) at least one organic diamine of the formula $H_2N—R'—NH_2$, wherein R' is a divalent radical containing at least one six-carbon atom rings, each ring characterized by benzenoid unsaturation, and, when at least two rings are present in R', no more than one valence bond is located on any one of said rings, and (2) at least one aromatic tetracarboxylic acid dianhydride and converting the resulting product to polyimide the improvement which comprises:

(a) reacting the diamine and the dianhydride in a solvent having a pH of about from 8.0 to 10.0;
(b) maintaining the concentration of the solution resulting from the reaction of the tetracarboxylic acid dianhydride and the organic diamine at about from 1 to 15% polymer;
(c) bringing the polymer solution into contact with a nonsolvent for the resulting polymer at a temperature of about from 0° to 65° C.;
(d) maintaining the ratio of the nonsolvent and original polymer solvent such that the combined solvent and nonsolvent contains no more than about 70% solvent; and
(e) agitating the mixture of polymer solution and nonsolvent to bring the nonsolvent and the solution into intimate contact so as to provide a surface area in the polyimide resin of greater than about 20 square meters per gram.

DETAILED DESCRIPTION OF THE INVENTION

Figure 1:
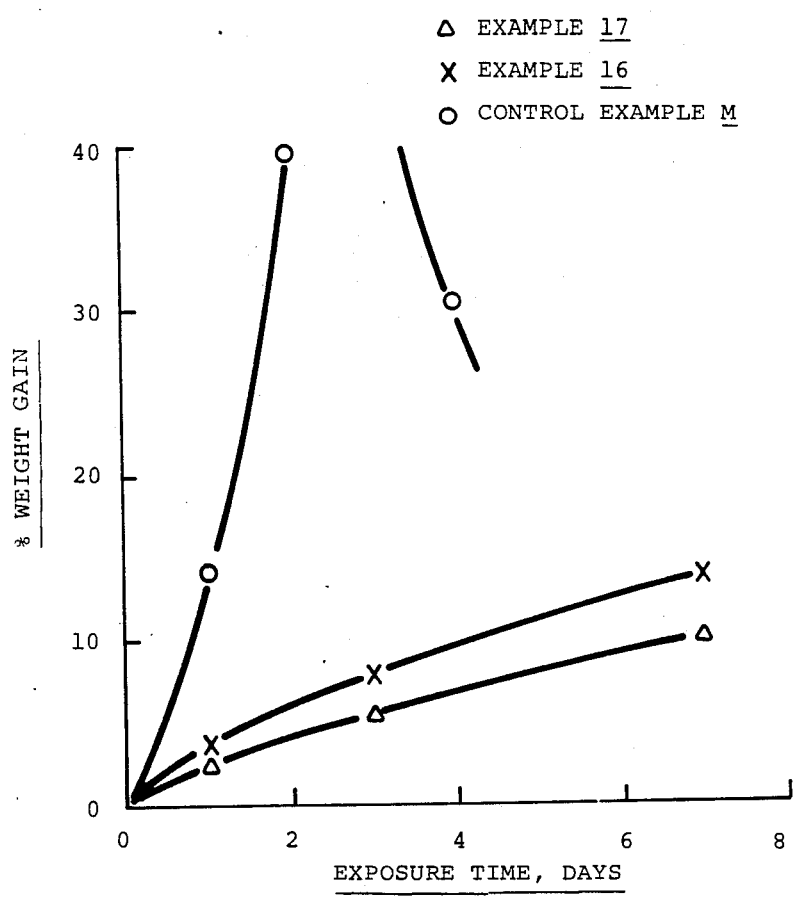
FIGS. 1, 2 and 3 are graphical illustrations of the performance of molding resins of the present invention compared to prior art resins when immersed in sodium hydroxide solutions.

The reactants used to prepare the present polyimide compositions are those described in Gall U.S. Pat. No 3,249,588, hereby incorporated by reference. In addition to those reactants specifically disclosed in the Gall patent, reactants can be used in which $R_2$, $R_3$, and $R_7$, as described in Gall, are partly or fully halogenated.

The polymer preparation involves the reaction of at least one organic diamine as defined therein with at least one tetracarboxylic acid dianhydride to form a polyamide acid. This polyamide acid is then precipitated from solution and subsequently converted to polyimide by heating. Within this reaction sequence, a careful control of the reaction parameters is needed to produce the improved polyimide compositions of the present invention, characterized by high surface area and low crystallinity.

In the preparation of the present polyimide compositions, the organic diamine reactant is generally first dissolved in a solvent. Solvents which can be used include those organic solvents whose functional groups will not react with either of the reactants to any appreciable extent, and which exhibit a pH of about from 8 to 10. The pH of the solvent can be measured by immersing a piece of water-moistened pH paper in the pure solvent. Such solvents include, for example, pyridine and β-picoline. Pyridine has been found to be particularly satisfactory in the preparation of the polyimides of the present invention having a high surface area. In addition, the quantity of solvent is important in obtaining a product having a high surface area. In particular, the solvent should be present in such a quantity that the concentration of the polymeric reaction product of the diamine and dianhydride is about from 1 to 15% by weight of the solution, and preferably about from 1 to 10%.

In general, after dissolving the organic diamine in an appropriate solvent and in the required concentration, the dianhydride reactant is added to the reaction solution. In the addition of the dianhydride reactant, additional solvent can be used, provided that the final concentration of the reaction product in the solvent is about from 1 to 15%. If desired, however, the dianhydride can be introduced before or at the same time as the diamine.

The polyamide acid is precipitated from solution by the addition of a nonsolvent for the polyamide acid. Such nonsolvents can be selected, for example, from acetone, ketone solutions or liquid hydrocarbons having at least three carbon atoms such as n-octane, n-hexane, toluene, liquid propane, cyclohexane, tetralin, halocarbons such as trichlorotrifluoroethane and aliphatic ethers such as diethyl ether. Of these, acetone, toluene and trichlorotrifluoroethane have been found to be particularly satisfactory.

The precipitation of the polyamide acid should be carried out at temperature of about from 0° to 65° C. Temperatures of about from 10° to 40° C. have been found particularly convenient.

The ratio in which the polymer solution and the nonsolvent are brought into contact is an important factor in obtaining the high surface area polyimides of the present invention. Specifically, the combined solvent and nonsolvent should contain no more than about 70% solvent. The solvent and nonsolvent are brought into intimate contact with agitation, so as to provide a surface area in the final polyimide, after conversion, of greater than about 20 m$^2$/g. In general, more vigorous agitation will result in higher surface area.

After precipitation of the polyamide acid from the initial reaction solution, the polyamide acid is preferably washed with nonsolvent to remove solvent. Typically, the washing is carried out at ambient conditions with additional quantities of the precipitating liquid, generally in quantities of at least about three times the volume of the polyamide acid. Failure to substantially completely remove residual solvent will result in low surface area in the finished resin.

After washing the precipitated polyamide acid. it can be converted to polyimide by heating to a temperature of about from 100° to 200° C., and preferably about from 150° to 180° C. Temperatures in excess of 200° C. will result in lower toughness in the molded product, while curing temperatures below about 100° C. will give inadequate conversion of the polyamide acid to polyimide. Typically, the conversion of the polyamide acid to polyimide is carried out in an inert atmosphere such as nitrogen so as to prevent hydrolytic and/or oxidative degradation of the resin.

Depending on the particle size resulting from the precipitation of polyamide acid from the reaction solution, the particles of polyimide can be further modified for example, by suitable grinding techniques, to provide a desirable particle size for handling and subsequent molding. The particulate polyimide can be molded under elevated pressures to a wide variety of configurations. It has been found to be particularly convenient to form the particulate polyimide at a pressure of about from 50.000 to 100,000 psi at ambient temperatures, followed by sintering at elevated temperatures, for example, for about 3 hours at about 400° C. These molding conditions typically result in a molded density of at least about 1.30 g/cc.

The resulting molded polyimide retains its substantially amorphous character. The polyimide, when molded to a density of at least about 1.30 g/cc, exhibits a Crystallinity Index, as measured by X-ray diffraction, of less than about 15. Crystallinity Index is measured as described by Jordan, U.S. Pat. No. 3,413,394. The molded polyimides exhibit a tensile elongation of greater than about 20% as measured by ASTM procedure D-638, using tensile bars described in FIG. 17 of E-8. Moreover, the tensile strength is at least 12 kpsi. Accordingly, the present polyimide compositions are particularly well suited for structural components where outstanding resistance to high temperatures, combined with excellent toughness, is required. In addition, the present compositions are unusually resistant to sodium hydroxide and acetic acid.

Fillers, and particularly carbonaceous fillers such as graphite, can also be used in the present polyimides to improve wear and frictional characteristics, while retaining, to a large extent, the improved tensile properties. For example, the incorporation of about from 2 to 10 weight % graphite will result in molded articles having an elongation of greater than about 18% and a tensile strength of greater than about 11.5 kpsi. The incorporation of about from 10 to 50 weight percent graphite will provide molded articles with greater than 4% elongation and a tensile strength of greater than about 7 kpsi. The graphite or other filler should be added prior to precipitation.

While the outstanding performance of the present products is not fully understood, it is believed to be a function of the high surface area combined with low crystallinity. Previous polyimide molding resins have been characterized either by high surface area and high crystallinity or low surface area and low crystallinity.

The present invention is further illustrated by the following specific examples, in which parts and percentages are by weight unless otherwise noted.

The specific surface area of a resin is the number of square meters of surface per gram of resin as measured by a nitrogen absorPtion technique. In these Examples, the measurements of this resin Parameter were made using the standard BET Procedure described by Barr and Anhorn in Chapter XII of "Scientific and Industrial Glassblowing and Laboratory Techniques" published in 1949 by Instrument Publishing Company.

Example 1 and Comparative Example A

In Example 1, 60 parts of 4,4'diamino-diphenyl ether (ODA) was charged to a dry, nitrogen-blanketed reaction vessel. The ODA was flushed into the flask during the addition of 1500 parts of pyridine with agitation. After the ODA was dissolved, 64.5 parts of pyromellitic dianhydride (PMDA) was added, stepwise, and was completely flushed into the system with an additional 150 parts of pyridine. After one hour agitation at room temperature, the inherent viscosity was measured as 1.05, and the solution concentration was 7.0%.

The solution of polyamide acid in pyridine was pumped at a rate of 65 parts/minute to a continuous-flow precipitator having agitation blades enclosed in a glass envelope equipped for two inflow streams and one outflow stream. Acetone flow to the precipitator was controlled at 70 parts/minute with a valve and rotometer and resulted in a 46% pyridine concentration in the effluent slurry stream. The reaction and precipitation were carried out at room temperature. The slurry was filtered in a medium porosity filter. Mother liquor was removed from the filter cake via displacement washing with about 1600 parts of acetone. The acetone wet filter cake was dried at 160° C. and 25" Hg vacuum under nitrogen for 16 hours. converting the polyamide acid to polyimide. The polyimide resin was ground in a mill employing a 30-mesh screen.

In Comparative Example A, a polyimide was prepared from the same reactants, but simultaneously precipitated and converted from polyamide acid to polyimide substantially according to the procedure shown in Gall, U.S. Pat. No. 3,249,588, Example 3.

The resins were tested according to ASTM procedure D-638, using tensile bars described in FIG. 17 of E-8. Tensile bars were direct formed from both polyimides at 100,000 psi and room temperature and were sintered for 3 hours at 405° C. The bars were formed using the procedures described in Jordan, U.S. Pat. No. 3,413,394.

Resin and molded product properties for the resins of Example 1 and and Comparative Example A are shown in Table I.

TABLE I
PHYSICAL PROPERTIES

| | Example A | Example 1 |
|---|---|---|
| Surface Area $\frac{meter^2}{gm}$ | 60 | 40 |
| Crystallinity Index | 30 | 12 |
| Infrared % Imide | 90 | 90 |
| Apparent Density $\frac{gms}{cc}$ | 0.20 | 0.15 |
| Mold Shrinkage % | 2.0–2.5 | 2.5–3.5 |
| Tensile Strength kpsi | 11.0 | 14.0 |
| Elongation % | 11 | 22 |
| Notched Izod Impact- $\frac{ft-lbs}{inch}$ | 1.5 | 2.7 |
| Izod Impact Reversed Notch $\frac{ft-lbs}{inch}$ | 11.0 | 30.4 |

COMPARATIVE EXAMPLE B

A polyamide acid was prepared using a freshly prepared solution of 12.01 parts of highly purified 4,4'diamino-diphenyl ether in 118 parts of highly purified N,N-dimethylacetamide (DMAc). This solution was added rapidly to a freshly prepared solution of 12.83 parts of pyromellitic dianhydride dissolved in 165 parts of DMAc, using vigorous agitation. 47 parts of DMAc was used to complete the transfer of one solution into the other. The solutions were prepared in a nitrogen atmosphere. The polyamide acid solution resulting after completion of the reaction had an inherent viscosity of 1.12. A portion of the polyamide acid solution was diluted to twice its volume with DMAc and precipitated by high shear agitation in a mixer filled with toluene. A large volume of toluene was required, providing a ratio of precipitant to solution of greater than 10 to 1. Excess solvent was decanted and the precipitate was washed with fresh toluene in the blender. The precipitate was dried and heated under a stream of nitrogen at 100° C. overnight, and by raising the temperature to 325° C. for 8 hours.

It was formed into tensile bars at a pressure of 100,000 psi and room temperature and subsequently sintered for 3 hours at 405° C. It was evaluated for tensile properties and found to exhibit a Tensile Strength of 3.6 kpsi and an elongation of 6.4%.

EXAMPLE 2 AND COMPARATIVE EXAMPLE C

In Example 2, 7.25 wt percent polyamide acid in pyridine solution was prepared from the same monomers as in Example 1. 100 parts of the polymer solution were fed at 20 parts per minute into 150 parts of trichlorotrifluoroethane contained in a high shear mixer operating at room temperature. The precipitation was instantaneous and quantitative and the resulting slurry was filtered and washed with trichlorotrifluoroethane. The filter cake was dried at 160° C. for 16 hours at 25 inches of mercury vacuum under nitrogen purge. The dried resin was ground through a 30 mesh screen. The dried resin was fabricated into tensile bars according to ASTM Procedure D-638, using tensile bars described in FIG. 17 of E8. The bars were formed at room temperature and 100,000 psi forming pressure and then free sintered for three hours at 405° C. under 1 atmosphere with nitrogen purge. The tensile strength and elongation of the bars were measured as 12.0 kpsi and 20%.

In Comparative Example C, tensile bars were similarly molded from polyimide resin prepared according to the procedure of Gall, U.S. Pat. No. 3,249,588, Example 3, and sintered at the same time. Those bars had a tensile strength of 10.6 kpsi and 7% elongation. The Crystallinity Index of Comparative Example C was 27.1.

EXAMPLE 3

The procedure of Example 2 was repeated, except the trichlorotrifluoroethane was replaced with acetone as the precipitant liquid. Tensile bars from this resin were sintered with the bars from Example 1 and showed a tensile strength of 13.1 kpsi and 26% elongation. The X-ray diffraction Crystallinity Index of the resin was measured, and found to be 13.9, in contrast to the Crystallinity Index for Control Example C of 27.1.

EXAMPLE 4 AND COMPARATIVE EXAMPLE D

The procedure of Example 3 was repeated, except the polyamide acid-pyridine solution concentration was 3.5 wt % and contained 15 wt % of graphite on a polymer basis. The graphite was Dixon Type 200-09 with a 5 micron average particle size. The resin had an X-ray diffraction Crystallinity Index of 12.0. In Comparative Example D, polyimide resin of Comparative Example A, but also containing 15 wt % of 5 micron graphite, was tested and had an X-ray diffraction Crystallinity Index of 32. The resin of Example 4 had a tensile strength elongation of 11.2 kpsi and 18%. The control resin tensile strength elongation values were 10.1 kpsi and 8%.

EXAMPLE 5 AND COMPARATIVE EXAMPLE E

Example 3 and Comparative Example A were repeated, except pyridine was replaced with β-Picoline. Polymer solution was fed to the blender at 250 parts per minute. The resin had a tensile strength of 12.6 kpsi and an elongation of 24%. The control resin in Comparative Example E had a tensile strength of 11.6 kpsi and 9% elongation.

The following examples are based on operation of a continuous precipitation system using polymer solutions as described in Gall U.S. Pat. No. 3,249,588. The polyamide acid solution is continuously passed to a precipitation vessel which is also supplied with a continuous flow of nonsolvent. The resulting slurry is then filtered and the filter cake is washed. The resulting polyamide is then dried in a vacuum tray drier at 175° C. to convert to polyimide and subsequently ground to pass through a 30 mesh screen.

The first series of examples demonstrates the response of the present resin properties to the concentration of pyridine in the precipitation environment.

EXAMPLE 6

In a continuous precipitation system, a nominally 7 wt % polyamide acid-pyridine solution was fed at 55 parts per minute and an acetone feed rate of 50 parts per minute. The concentration of pyridine in the precipitation environment was 51%, the temperature was nominally 25° C., and the agitator as operated at maximum speed.

The precipitated polymer was filtered, washed with nominally 3 cake volume of acetone, and dried for 16 to 20 hours at 175° C. at 25 in. of mercury vacuum. The dried resin was ground with a mill through a 30-mesh screen. The resin had a crystallinity Index of 12.5, a surface area of 46.3 $m^2$/gm, and a tensile strength/elongation of 12.9 kpsi/23%. A control resin prepared as in Comparative Example A had a Crystallinity Index of 27, a surface area of 56.8 $m^2$/gm, a tensile strength of 11.6 kpsi and an elongation of 9.5%.

The infrared spectrum of the resin (the absorbance ratio of the band at 725 $cm^{-1}$ to the band of 1027 $cm^{-1}$ and assuming the absorbance ratio of about 3.10 represents 100% imidization) indicated a degree of imidization of 89%. The control resin showed a degree of imidization of 100%.

EXAMPLE 7

Example 6 was repeated, except the acetone rate was 80 parts per minute and the concentration of pyridine in the precipitation environment was 39%. The resin had an X-ray diffraction Crystallinity Index of 9.9, a Surface Area of 55.3 $m^2$/gm, and a tensile strength of 13.3 kpsi and an elongation of 24%.

EXAMPLE 8

Example 6 was repeated, except the acetone rate was 42 parts per minute and the pyridine concentration in the precipitation environment was 55%. The resin had a Crystallinity Index of 12.8, a surface area of 36.4 $m^2$/gm, a tensile strength of 13.1 kpsi and an elongation of 25%. The infrared spectrum of the resin showed 92% imide.

EXAMPLE 9

Example 6 was repeated, except the acetone rate was 34 parts per minute and the pyridine concentration in the precipitation environment was 60%. The resin had an X-ray diffraction Crystallinity Index of 12.8, a surface area of 32.6 $m^2$/gm, and a tensile strength and elongation of 12.7 kpsi and 28%, respectively.

EXAMPLE 10

Example 6 was repeated, except the acetone rate was 28 parts per minute and the pyridine concentration in the precipitation environment was 65%. The resin had a tensile strength and elongation of 14.2 kpsi and 29%, respectively.

EXAMPLE 11

Example 6 was repeated, except the acetone rate was 22 parts per minute and the pyridine concentration in the precipitation environment was 70%. The resin had an X-ray diffraction Crystallinity Index of 11.8, a surface area of 22.7 $m^2$/gm and a tensile strength and elongation of 11.1 kpsi and 20% respectively.

COMPARATIVE EXAMPLE F

Example 6 was repeated, except the concentration of solvent in the precipitation environment was 75% pyridine. The acetone feed rate was 18 parts per minute. The resin had a Crystallinity Index of 10.5, a surface area of 11.7 $m^2$/gm, and a tensile strength and elongation of 10.6 kpsi and 19%, respectively.

In Comparative Examples G-H, polyimide products were prepared in solvents having a pH less than about from 8 to 10.

COMPARATIVE EXAMPLE G 200 parts of a 9 wt % PAA in dimethyl acetamide solution, having a pH of about 7, was added to 1735 parts of toluene in a high shear mixer operating at room temperature. The slurry was filtered and washed with 3 cake volumes of toluene and dried at 175° C. for 18 hours at 25 inches of mercury vacuum under nitrogen. The dried resin was ground through a 30 mesh screen. The resin had a Crystallinity Index of 14.8, a surface area of 12.6 $m^2$/gm, and a Tensile Strength and elongation of 10.0 kpsi and 5.3%, respectively.

COMPARATIVE EXAMPLE H

Comparative Example G was repeated, except the PAA/DMAc solution was 3.5 wt % PAA. The Crystallinity Index of the resulting resin was 12.5, the surface area was 11.9 $m^2$/gm, and the Tensile Strength and elongation were 7.6 kpsi and 3.5%, respectively.

EXAMPLES 12-15 and COMPARATIVE EXAMPLES I-L

In Examples 12 to 15 and Comparative Examples I-L, tensile bars were direct formed at 100,000 psi at room temperature from resin respectively prepared according to the present invention and by the simultaneous conversion and precipitation shown in Gall, U.S. Pat. No. 3,249,588, Example 3. The response of tensile strength and elongation to sintering temperature was determined for both resins as shown in the following Table II:

TABLE II

| Example | Sintering - °C. | TS/E - KPSI/% |
| --- | --- | --- |
| 12 | 405 | 14.1/22 |
| I | 405 | 11.2/9.5 |
| 13 | 380 | 13.3/25 |
| J | 380 | 10.5/8.1 |
| 14 | 350 | 12.9/25 |
| K | 350 | 9.2/5.3 |
| 15 | 300 | 11.6/22 |
| L | 300 | 4.3/1.5 |

EXAMPLES 16-17 AND COMPARATIVE EXAMPLE M

Figure 2:
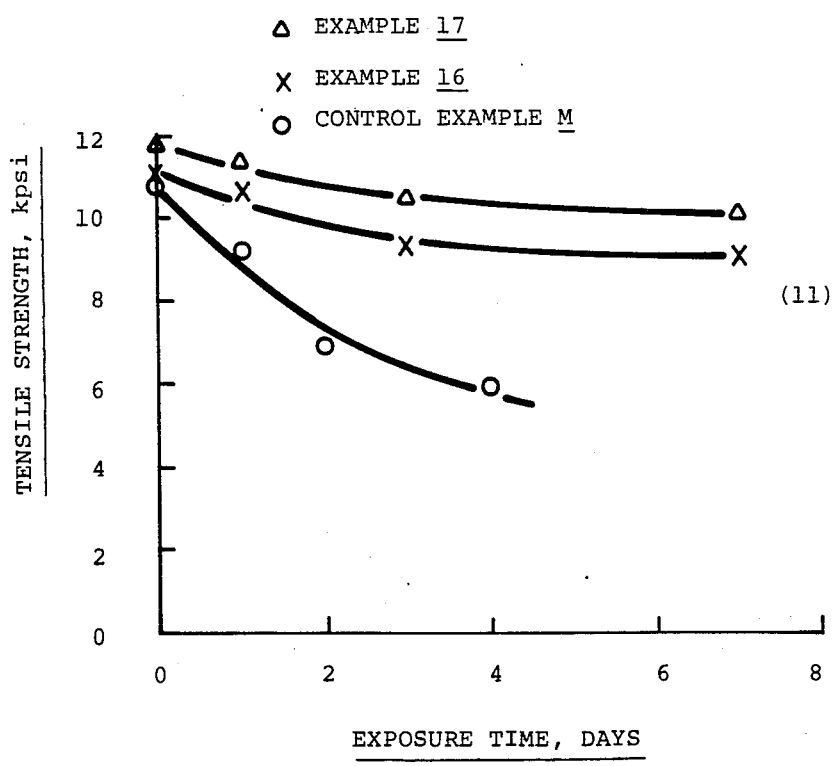
Figure 3:
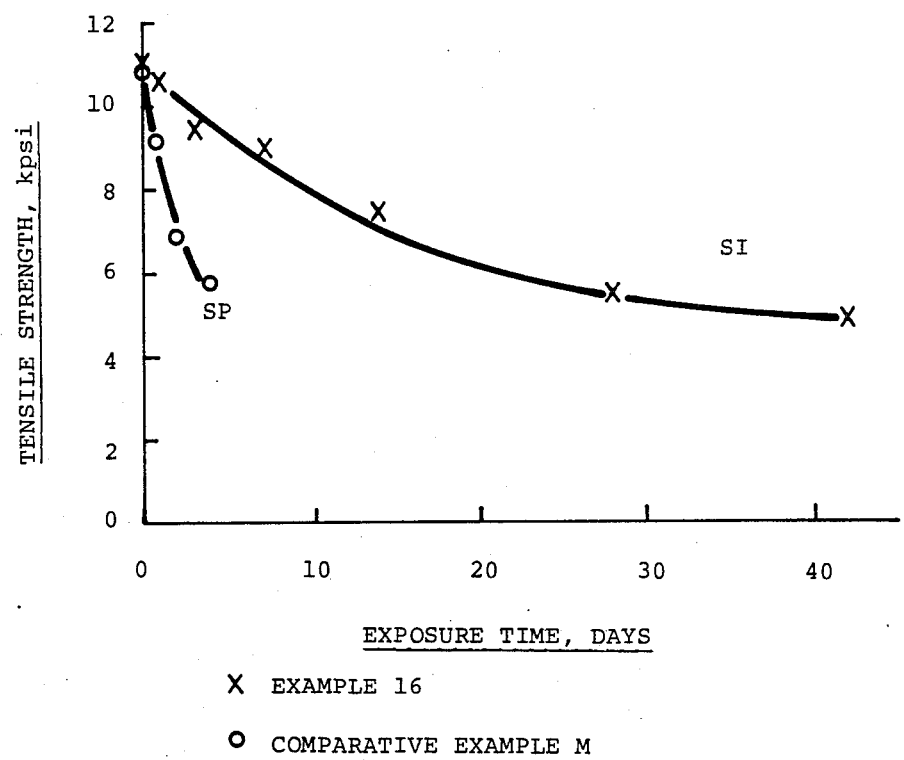

ASTM-E8 Tensile bars were direct formed at the standard 100,000 psi pressure from the same resin used in Examples 12-15 and Comparative Examples I-L. Bars from both resins were sintered at 405° C. for 3 hours. In Example 17, a separate set of bars formed from the resin of the present invention was sintered at 380° C. for 3 hours. The bars were immersed in a 1% sodium hydroxide solution at 50° C. FIGS. 1 and 2 show a rapid gain in weight of the bars of Comparative Example M during the first two days' exposure followed by a rapid loss in weight as the bars soften and lose material at the surface. The bars of Example 16 gain weight at a much lower rate and maintain tensile strength superiority. The tensile strength after exposure is shown in FIG. 3 for Example 16 and Comparative Example M. The resin of the present invention loses Tensile Strength more slowly.

EXAMPLE 18 AND COMPARATIVE EXAMPLE N

Figure 4:
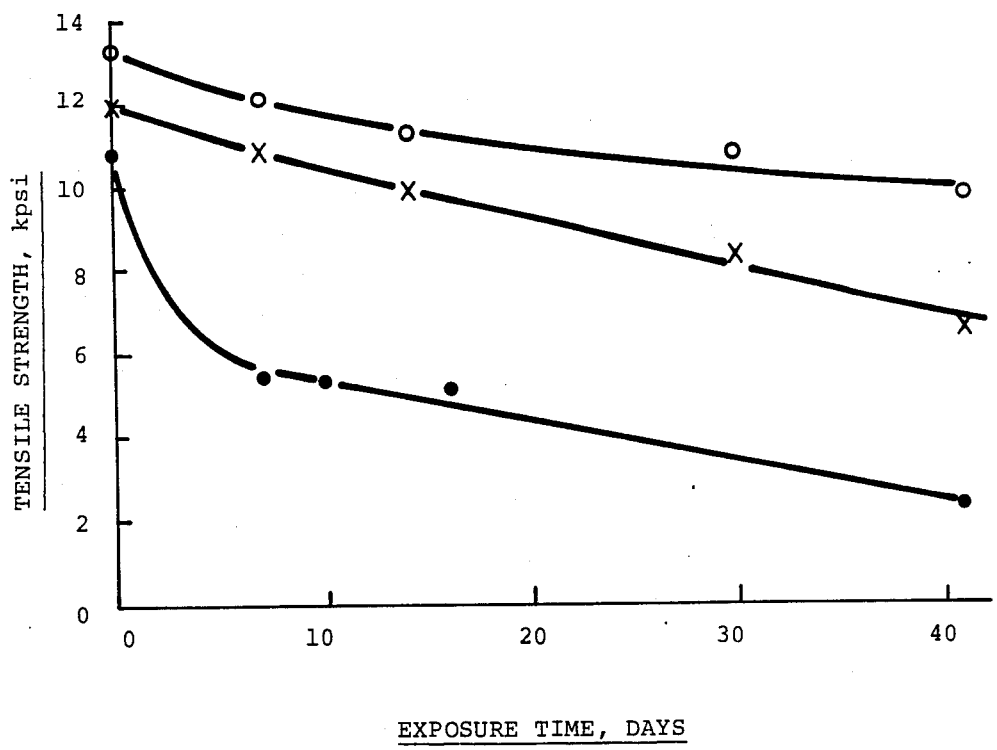
FIG. 4 is a graphical comparison of tensile strength when resins of the present invention and the prior art are exposed to refluxing acetic acid.

The procedure of Example 16 and Comparative Example M was repeated, except the tensile bars were exposed to a refluxing (102°-103° C.) 15% aqueous acetic acid environment. FIG. 4 shows the remarkable tensile strength retention of the bars prepared from the present resin relative to the bars of the Comparative Example after 41 days' exposure.

The following examples illustrate the properties of graphite-filled resin of the present invention compared to graphite-filled resin of the prior art.

EXAMPLE 19

Using the continuous precipitation procedure of Example 5, a polyimide was prepared. A 6.5 wt % PAA/-pyridine solution containing 10 wt % (based on weight of polyimide resin to be formed) of Lonza KS-5 graphite having an average particle size of 5 microns was fed at 55 parts/minute. Acetone was fed at 35 parts/minute for a pyridine concentration of 60 wt % in the precipitation environment. The slurry was filtered in a 4 liter glass fritted funnel and washed with 3 cake volumes of acetone. The filter cake was tray dried at 170° C. for 16 hours at 25" $H_2$ vacuum with a nitrogen purge. The dried resin was ground in a Wiley mill through a 30 mesh screen. The resin had a Crystallinity Index of 12.9, a surface area of 26.5 m²/gm, and a tensile strength and elongation of 12.3 kpsi and 25%, respectively.

EXAMPLE 20

Example 19 was repeated, except 20 wt % of the graphite was included in the PAA/pyridine solution. The resin had a Crystallinity Index of 13.8, a surface area of 25.0 m²/gm, and a tensile strength and elongation of 10.7 kpsi and 19%, respectively.

EXAMPLE 21

Example 19 was repeated except 40 wt % of the graphite was included in the PAA/pyridine solution. The resin had a Crystallinity Index of 15.1, a surface area of 20.4 M² and gm, and a tensile strength and elongation of 8.8 kpsi and 7.2% respectively.

EXAMPLE 22

Example 19 was repeated except 30 wt % of the graphite was included in the PAA/pyridine solution. The resin had a Crystallinity Index of 15.8, a surface of 23.8 m²/gm, and a tensile strength and elongation of 9.2 kpsi and 12%, respectively.

EXAMPLE 23

Example 19 was repeated except 50 wt % of the graphite was included in the PAA/pyridine solution. The resin had a Crystallinity Index of 16.8, a surface area of 24.2 m²/gm, and a tensile strength and elongation of 8.2 kpsi and 5.3%, respectively.

COMPARATIVE EXAMPLES O & P

The procedure of Examples 19-23 was repeated, except that a polyimide resin prepared according to Comparative Example A was used. The graphite concentrations were 15% and 37%, respectively.

The comparative Crystallinity Index and surface area for the graphite-filled resins of Examples 19-23 and Comparative Examples O & P are shown in Table III.

Figure 5:
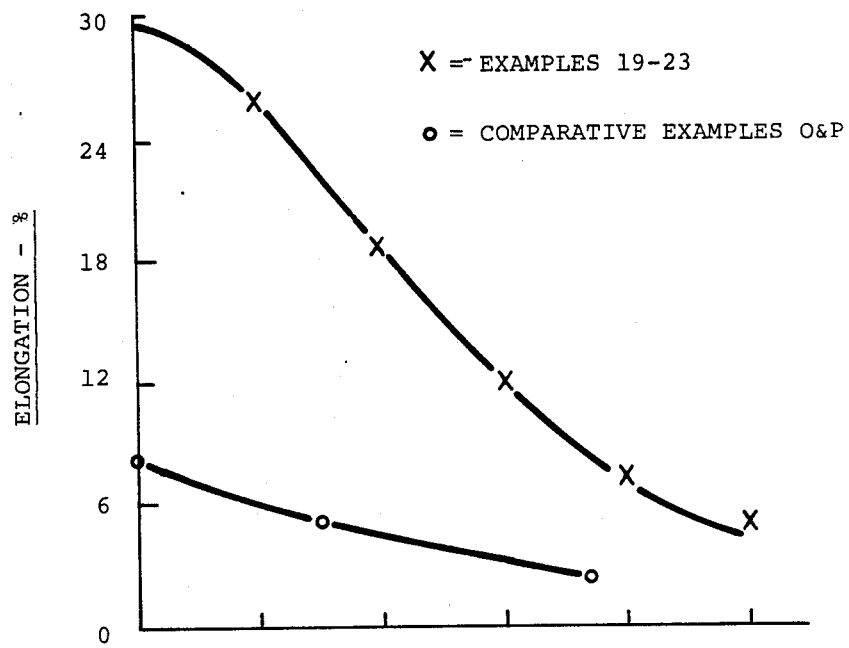
FIGS. 5 and 6 are graphical comparisons of tensile strength and elongation of resins of the present invention and the prior art containing various concentrations of graphite.
Figure 6:
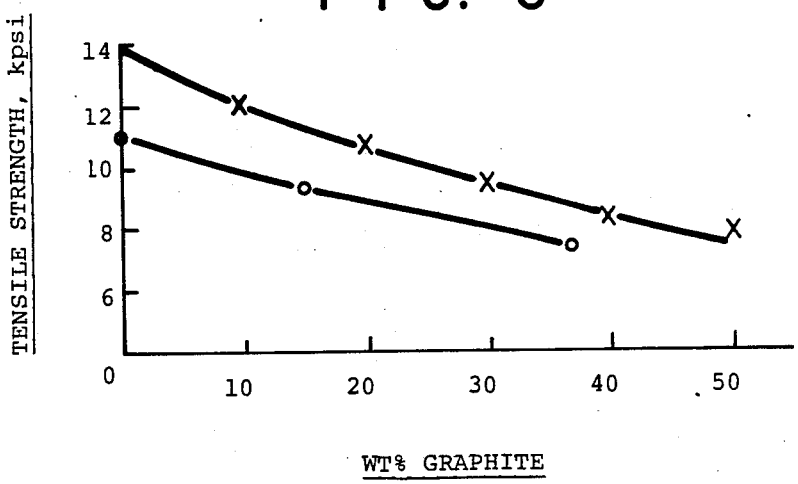

The tensile properties of graphite-filled resin of the present invention relative to graphite-filled resins of polymer prepared according to Comparative Examples O and P are shown in FIGS. 5 and 6.

TABLE III

COMPARATIVE CRYSTALLINITY AND SURFACE AREA VALUES FOR GRAPHITE FILLED POLYIMIDE RESINS

| Resin | Wt % Graphite | Crystallinity Index | Sa M²/gm |
| --- | --- | --- | --- |
| 19 | 10 | 12.9 | 26.5 |
| 20 | 20 | 13.8 | 25.0 |
| 21 | 40 | 15.1 | 20.4 |
| 22 | 30 | 15.8 | 23.8 |
| 23 | 50 | 16.8 | 24.2 |
| O | 15 | 30 | 60 |
| P | 37 | 55 | 60 |

I claim:

1. In a solid particulate polyimide, the polyimide having the recurring unit

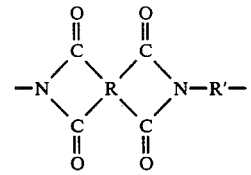

wherein R is a tetravalent radical containing at least one 6-carbon atom ring characterized by benzenoid unsaturation and wherein the four carbonyl groups are attached directly to different carbon atoms in the radical and wherein each pair of carbonyl groups is attached to adjacent carbon atoms in a 6-membered benzenoid ring of the radical and wherein R' is a divalent radical containing at least one six-carbon atom ring, each ring characterized by benzenoid unsaturation, and when at least two rings are present in R', no more than one of the valence bonds is located on any one of the rings, said particles having a surface area of greater than 20 square meters per gram, the improvement wherein the polyimide exhibits a Crystallinity Index of less than about 15, as measured by X-ray diffraction.

2. A molded article of the polyimide of claim 1 having a density of at least about 1.30 g/cc and containing less than about 2% filler and which exhibits a tensile elongation of greater than about 20% and a tensile strength of greater than about 12 kpsi.

3. A molded article of the polyimide of claim 1 having a density of at least about 1.30 g/cc and containing less than about 10% filler and which exhibits a tensile elongation of greater than about 18% and a tensile strength of greater than about 11.5 kpsi.

4. A molded article of the polyimide of claim 1 having a density of at least about 1.30 g/cc and containing less than about 50% filler and which exhibits a tensile elongation of greater than about 4% and a tensile strength of greater than about 7 kpsi.

5. A molded article of claim 2 wherein the filler is graphite.

6. In a process for the preparation of a solid particulate polyimide by the reaction of (1) at least one organic diamine of the formula $H_2N-R'-NH_2$, wherein R' is a divalent radical containing at least one six-carbon atom ring, each ring characterized by benzenoid unsaturation, and, when at least two rings are present in R', no more than one valence bond is located on any one of said rings, and (2) at least one tetracarboxylic acid dianhydride and converting the resulting product to polyimide, the improvement which comprises:

(a) reacting the diamine and the dianhydride in a solvent having a pH of about from 8.0 to 10.0;
(b) maintaining the concentration of the solution resulting from the reaction of the tetracarboxylic acid dianhydride and the organic diamine at about from 1 to 15% polymer;
(c) bringing the polymer solution into contact with a nonsolvent for the resulting polymer at a temperature of about from 0° to 65° C.;
(d) maintaining the ratio of the nonsolvent and original polymer solvent such that the combined solvent and nonsolvent contains no more than about 70% solvent; and
(e) agitating the mixture of polymer solution and nonsolvent to bring the nonsolvent and the solution into intimate contact so as to provide a surface area in the polyimide resin of greater than about 20 square meters per gram.

7. A process of claim 6 wherein the concentration of the solution resulting from the reaction of the tetracarboxylic acid dianhydride and the organic diamine is maintained at about from 1 to 10% polymer.

8. A process of claim 6 wherein the solvent is pyridine.

9. A process of claim 6 wherein the solvent is $\beta$-picoline.

10. A process of claim 6 wherein the concentration of the solution resulting from the tetracarboxylic acid dianhydride and the organic diamine is less than about 10%.

11. A process of claim 6 wherein the polymer solution is brought into contact with the nonsolvent at a temperature of about from 10° C. to 40° C.

* * * * *